Figure 1:
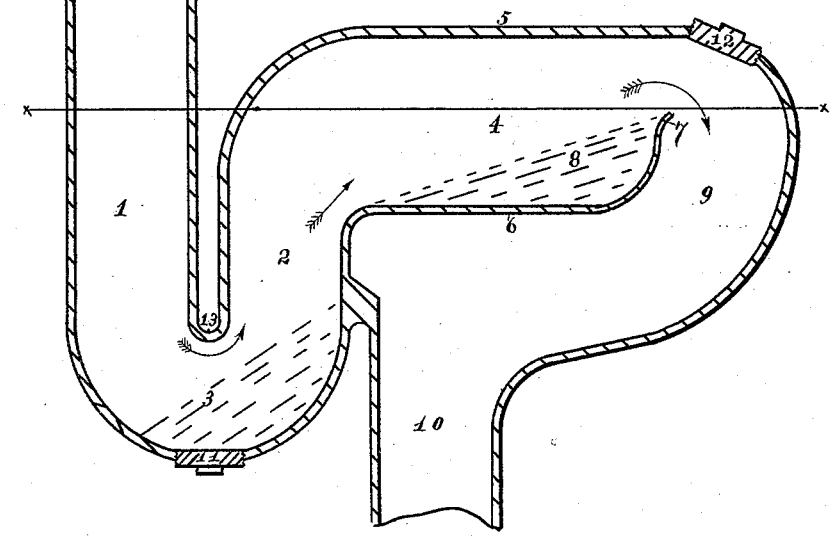

(No Model.)

F. H. PARADICE.
ANTI SIPHONING TRAP.

No. 387,252. Patented Aug. 7, 1888.

WITNESSES:
S. S. Gray.
G. W. Hall

INVENTOR·
Frank H. Paradice
BY R. W. McDermott.
his
ATTORNEY.

UNITED STATES PATENT OFFICE.

FRANK H. PARADICE, OF DENVER, COLORADO.

ANTI-SIPHONING TRAP.

SPECIFICATION forming part of Letters Patent No. 387,252, dated August 7, 1888.

Application filed April 6, 1888. Serial No. 269,841. (No model.)

*To all whom it may concern:*

Be it known that I, FRANK H. PARADICE, a subject of the Queen of Great Britain, residing at Denver, in the county of Arapahoe and State of Colorado, have invented certain new and useful Improvements in Anti-Siphoning Traps, of which the following is a specification, reference being had therein to the accompanying drawings.

My invention relates to an improved construction of trap for use in the discharge-pipes attached to sinks, bowls, tubs, closets, and similar articles, and used also in house sewer-connections, soil-pipes, and other situations and relations; and its objects are to furnish a trap in which siphonage of the water sealing the trap shall be so guarded against that a water seal adequate to prevent the backflow through the trap of foul air, gases, or stenches will be preserved; an anti-siphonage trap having no movable parts or extraneous seals requiring watchfulness, care, and attention in the fitting thereof and in the maintenance, but wherein the anti-siphonage devices are an integral part of the trap itself, yet which is a trap of simple construction, as easily and readily applied as is the common trap, either in new work or in repairs, reliable in operation and durable in use, simplifying the drainage system by doing away with long lines of vent-pipes, reducing the amount of material and the number of joints to a minimum, and reducing in the same ratio the danger of leaks; to which ends it consists in the features and combinations more particularly hereinafter described and claimed.

In the drawings is illustrated a trap embodying my invention, in which—

Figure 2:
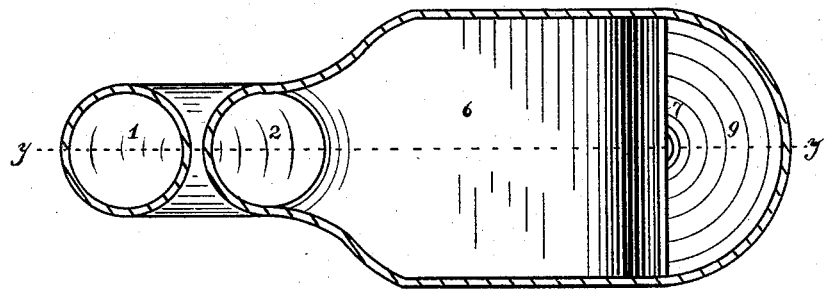

Figure 1 is a central vertical section thereof; and Fig. 2, a horizontal section on line $xx$, Fig. 1, the section in Fig. 1 being also on the line $yy$, Fig. 2.

In the figures, the reference-numeral 1 indicates the first downcast pipe, or pipe from the article to be discharged, while 2 is the upcast pipe, the pipes 1 and 2 passing into each other through the bend or inverted siphon 3, wherein the water seal is to be maintained.

Instead of the upcast pipe 2 of the trap 3 immediately curving into the second downcast or discharge pipe, as is the case in the ordinary S-trap, it leads into a chamber, 4, formed integral with the remaining portions of the trap, and located between the first bend or seal 3 and the second bend or discharge. The walls 5 6 of such chamber are continuations of the walls of the pipe 1 2; but the upper or outer portion, 5, continues on and curves into the outer wall or side of the downcast 9 and discharge 10, while the opposite portion or bottom of the chamber 4 terminates in an upturned flange or end, 7, there dividing the chamber 4 from downcast curve 9 and discharge 10, such upturned end forming in effect a portion of the outer side of the upcast 2, but separated therefrom by the length of the chamber 4. This chamber 4 leads into the bend 9, connected to the discharge-pipe 10, or pipe leading to the stand or soil pipe or to the sewer direct. With such a combination, if siphonage of the sealing-water in trap-curve 3 should be started by a sudden disturbance of the atmospheric equilibrium on the two sides of the seals, the water would be driven over the upper edge of the flange or end 7. It is evident, however, that such end or flange would hold back and retain in the space 8, formed by it, a quantity of water, as indicated in dotted lines, and that some also would be held back in bend 3, as similarly indicated, the path of the flow of the water under the pressure of the air in siphonage being indicated by the arrows.

When the level of the water falls below the point 13, being the upper and inner curve of the trap-bend 3, air would be admitted from one side to the other of the seal and the equilibrium on the two sides thereof consequently restored and the flow cease. Thereupon whatever water remained in 3 would fall to a level, while the body retained in space 8 by the end 7 would flow back into the bend 3, raising the water-level above 13, restoring and maintaining the water seal thereat.

The capacity given the retaining portion 8 should preferably be sufficient to retain water enough to insure the sealing of trap-bend 3 independently of any water retained in such bend itself, to which end, while the pipes 1, 2, and 10 may be of the ordinary cylindrical shape or may be oval in cross-section, the chamber 4 is enlarged horizontally and transversely, as shown in Fig. 2, so that the area in cross-section of the chamber 4 is greater than that of the connected pipes.

It is evident that the water retained in 8 by the upturned end or flange 7 cannot be driven out by siphonage, and that in case of siphonage it will be held there irrespective of any differences of pressure in 1 and 10.

If there should be no actual siphonage flow of water from the seal, but air merely be forced therethrough, carrying with it water in drops and in spray, as sometimes happens even to the extent of destroying the seal, such air and water would strike the upper part of the chamber 4 and the water be collected thereon and trickle back, or else it would rebound therefrom and be caught upon the bottom 6 of the chamber 4 and not be carried into and off through the discharge 10, so that loss of the water seal in 3 from either of the causes usually producing such loss is fully guarded against and prevented. In addition to the usual clean-out hole and cap, 11, at the base of trap-bend 3, it is advisable to use a second one, 12, located as shown, so that every part of the trap may be cleaned when desired.

The whole trap is constructed as a homogeneous integral whole, having only the joints used with the ordinary trap—that is, joints where 1 and 10 are joined in the general system; hence there is no packing of joints to decay or wear and become loose and leaky, no extraneous seals to be looked after, no attention to be paid to seeing that there is a proper supply of mercury or other material in such extraneous vents or seals. It is a trap whose seal cannot be broken by any action brought to bear upon it under the conditions ordinarily met with in plumbing. Being of one material and homogeneous, its parts cannot be affected nor loosened by unequal expansion, as may happen where two dissimilar materials having different coefficients of expansion and contraction. At the same time, the area in chamber 4 being so much larger than that of 10, back-pressure coming up through 10 is so diffused that it cannot break the seal in 3.

Having thus described my invention, what I claim is—

1. The combination, with a trap and its inlet and discharge pipes, of a chamber interposed between the trap and the discharge-pipe and having an upturned end or flange at its union with the discharge-pipe, substantially as set forth.

2. The combination of the inlet-pipe 1, the trap 3, discharge-pipe 10, the chamber 4, interposed between the trap and the discharge-pipe and longitudinally and transversely enlarged and having the upturned end or flange 7, substantially as set forth.

In testimony whereof I affix my signature in presence of two witnesses.

FRANK H. PARADICE.

Witnesses:
Z. F. WILBER,
F. W. STANDART.